3,431,280
1,3-CYCLIC ACETAL-2-YL SUBSTITUTED ALKANALS, ALKANOLS AND ESTERS
Heinz F. Reinhardt, Claymont, Del., assignor to E. I. du Pont de Nemours and Company, Wilmington, Del., a corporation of Delaware
No Drawing. Continuation-in-part of applications Ser. No. 237,298, Nov. 13, 1963, and Ser. No. 428,192, Jan. 26, 1965. This application June 15, 1967, Ser. No. 646,178
U.S. Cl. 260—340.9         6 Claims
Int. Cl. C07d *13/04;* C08f *3/40*

ABSTRACT OF THE DISCLOSURE

Compounds of the formula $$\begin{array}{c} R_1-\overset{H}{\underset{|}{C}}-O \\ (R_4)_y \quad\quad C-(CH_2)_x-R_2 \\ R_3-\underset{H}{\overset{|}{C}}-O \end{array}$$

where $R_1$ and $R_3$ are hydrogen or various unsaturated radicals, $R_2$ is a $$-\overset{O}{\underset{}{\overset{\|}{C}}}H$$

—$CH_2OH$ or a diester group and
$R_4$ is methylene, ethylene, ethylidene or isopropylidene, useful as film-forming components in coating compositions.

CROSS-REFERENCES TO RELATED APPLICATIONS

This application is a continuation-in-part of application Ser. No. 428,192, filed Jan. 26, 1965, and a continuation-in-part of Ser. No. 237,298, filed Nov. 13, 1962, both now abandoned.

SUMMARY OF THE INVENTION

This invention relates to a new class of 1,3-cyclic acetal compounds. It in particular relates to a class of 1,3-cyclic acetal-2-yl substituted alkanals, alkanols and esters of these alkanols.

The cyclic acetal compounds of this invention are represented by the following structural formula $$\begin{array}{c} R_1-\overset{H}{\underset{|}{C}}-O \\ (R_4)_y \quad\quad CH(CH_2)_x-R_2 \\ R_3-\underset{H}{\overset{|}{C}}-O \end{array}$$

where
$x$ can be 2 or 3,
$y$ can be 0 or 1,
$R_1$ and $R_3$ can be hydrogen, vinyl, isopropenyl or allyloxymethyl, provided one of $R_1$ or $R_3$ is other than hydrogen,
$R_2$ can be $$-C\overset{O}{\underset{H}{\diagdown}}$$

—$CH_2OH$ $$-CH_2-O-O-\overset{O}{\underset{}{\overset{\|}{C}}}-R_5-\overset{O}{\underset{}{\overset{\|}{C}}}-O-O-(CH_2)_x-\overset{H}{\underset{|}{C}}\overset{\diagup O-\overset{|}{C}-R_1}{\diagdown}\;(R_4)_y$$
$$\quad\quad\quad\quad\quad\quad\quad\quad\quad\quad\quad\quad\quad\quad\quad\quad\quad\quad\quad\quad\quad\quad\quad\quad O-\underset{H}{\overset{|}{C}}-R_3$$

where $R_5$ is a direct carbon to carbon bond, alkylene of 1 through 10 carbon atoms or alkenylene of 2 through 14 carbon atoms;

$$-CH_2-O-\overset{O}{\underset{}{\overset{\|}{C}}}-R_6$$

where $R_6$ is hydrogen, alkyl of 1 through 7 carbon atoms, alkenyl of 2 through 16 carbon atoms, or aryl of 6 through 13 carbon atoms;

or $$-CH_2-O-\overset{O}{\underset{}{\overset{\|}{C}}}-(CH_2)_y-C\overset{\diagup O-\overset{H}{\underset{|}{C}}-R_1}{\underset{\diagdown O-\underset{H}{\overset{|}{C}}-R_3}{(R_4)_x}}$$

and $R_4$ can be methylene, ethylene, ethylidene or isopropylidene.

The 1,3-cyclic acetal alkanals of this invention can be prepared by the condensation (for the butanals) of alkoxydihydropyrans or dialkoxytetrahydropyrans with various polyols, as disclosed in copending application by H. F. Reinhardt, Ser. No. 185,804, filed Apr. 9, 1962, now U.S. Patent 3,232,907. The analogous propanals can be prepared by a similar condensation of alkoxydihydrofuran or dialkoxytetrahydrofuran with the desired polyol. Upon reduction of these alkanals under certain conditions, corresponding alkanols can be produced. (In such condensations, a portion of the produced material may be a bis cyclic acetal alkane.)

Where these alkanals are prepared, for example, by the above condensation with glycols as the polyol, the $R^1$, $R^3$ and $R^4$ substituents on the acetal rings are determined by the choice of glycol.

The 1,3-cyclic acetal propanols and butanols of the invention can in turn be converted into esters of such mono- and polycarboxylic acids as (a) $C_1$ to $C_{18}$ alkanoic acids—formic, acetic, propionic, butyric, pentanoic, hexanoic, heptanoic, octoic, nonoic, decenoic, undecanoic, dodecanoic, myristic, palmitic and stearic;

(b) $C_2$ to $C_{12}$ alkandioic acids—oxalic, malonic, succinic, glutaric, adipic, suberic, azelaic and sebacic.

(c) $C_3$ to $C_{18}$ alkenoic acids—acrylic, methacrylic, ethacrylic, crotonic, tiglic, chloracrylic, cyanacrylic, sorbic, oleic, linoleic, ricinoleic, and oil acids of such oils as castor oil, dehydrated castor oil, linseed oil, tung oil, safflower oil, menhaden oil and soya bean oil;

(d) $C_7$ to $C_{13}$ arylcarboxylic acids—benzoic, toluic, phthalic, isophthalic, terephthalic, trimesic, pyromellitic, bibenzoic, naphthoic, chlorbenzoic, hexahydrophthalic, salicyclic and acetylsalicylic;

(e) $C_4$ to $C_6$ alkenedioic acids—maleic, fumaric and itaconic.

The cyclic acetal alkanol esters can be prepared, for example, by transesterification of lower alkyl esters of the above acids with the desired cyclic acetal alkanol using an azeotrope-forming aromatic solvent such as toluene, and a catalyst such as lead octoate, metallic sodium or sodium methoxide.

The compounds of the invention, in combination with soluble siccative metal compounds, are useful as film-forming components in air-drying coating compositions. Preferred for such use are esters of vinyl- and isopropenyl-1,3-cyclic acetal butanols with such unsaturated acids as acrylic, methacrylic, maleic, itaconic, sorbic or the oil acids listed above.

Compositions containing soluble compounds of siccative metals such as cobalt, and optionally containing additional peroxidic compounds, are particularly preferred for improved rate of curing. Other siccative metals such as iron, manganese, lead and cerium, as soluble compounds, can be used. A range of 0.01 to 2.0 weight percent of siccative metal is preferred.

Clear and pigmented coating compositions can be prepared from the compounds of this invention by conventional dispersion techniques. These coatings can be applied by dipping, spraying, knifing and other techniques well known in the art. They can be applied to fabric, leather, felt, paper, steel, ceramic and plastic type substrates. These compositions can be baked at elevated temperatures to improve the rate of cure.

Unexpectedly, the coatings show a high level of adhesion to many substrates, e.g. anti-corrosion treated steel. Ultraviolet light exposure is particularly effective in initiating polymerization of these materials.

The following examples illustrate compounds of this invention. All parts are by weight.

EXAMPLE 1

A stirred reaction vessel fitted with thermometer and reflux column and distillation head is charged with 261 parts (1.5 mol) of diethoxytetrahydropyran and 171 parts (1.5 mol) of divinyl glycol. A few bubbles of HCl gas are passed into the mixture, the vessel sealed and then heated to about 88° C. Ethanol is distilled over.

After 2½ hours, the contents of the vessel are at about 170° C. The reaction mixture is cooled to about room temperature and 20 parts of anhydrous potassium carbonate are added. The mixture is stirred for about one hour and then filtered.

The filtrate is then fractionally distilled, under reduced pressure, with a small amount of added hydroquinone. At a pot temperature between about 120° C. to 145° C. and at 2.5 mm. Hg pressure, a fraction is collected which distills between 99° C. to 116° C.

This fraction is then refractionated on a three-foot spinning band column. A cut between about 71° C.–72° C. at 0.15 mm. Hg pressure is collected which is analyzed as follows:

Calc.: C, 67.32%; H, 8.22%. Found: C, 67.48%; H, 8.27%.

This material is identified by its infrared spectra as (4,5-divinyl-1,3-dioxolan-2-yl)butanal.

Five parts of this cut are blended with 0.0025 part of cobalt butyl phthalate (in acetone solution), and then coated about 1.5 mils thick on a glass panel and a Bonderited steel panel, and air dried. After 1.5 hours the coated panels are tacky, and in about 5 hours are tack-free, glossy and colorless. At elevated temperatures, other coated panels become tack-free in about 30 minutes at 100° C. or 10 minutes at 150° C.

EXAMPLE 2

The butanal of Example 1 is reduced to the corresponding butanol as follows:

A solution of 116 parts (0.6 mol) of (4,5-divinyl-1,3-dioxolan-2-yl)butanal in about 70 parts of ethyl ether is prepared. This solution is then added slowly, with stirring, over a period of about 2½ hours, at room temperature, to a solution of 8 parts (0.2 mol) of lithium aluminum hydride in about 105 parts of ethyl ether in a sealed reaction vessel. A slow purge of nitrogen gas is maintained on the vessel during the reaction period.

After an additional 1½ hours of stirring, the product is stirred into 1000 parts of ice water containing about 28 parts of 36% concentrated HCl and 200 additional parts of ethyl ether. After this mixture is thoroughly blended, the ether layer is decanted and the aqueous layer extracted with a fresh 140-part portion of ether. The ether solutions are then combined, dried over anhydrous sodium sulfate, filtered and stripped of ether.

The product is fractionated and the cut at about 103° C. to 104° C. and 0.55 mm. Hg is collected on a spinning band column. The distillate is identified by infrared spectral and elemental analysis as (4,5-divinyl-1,3-dioxolan-2-yl)butanol.

Calc.: C, 66.64%; H, 9.15%. Found: C, 65.93%; H, 9.15%.

EXAMPLE 3

The butanol of Example 2 is converted into a fumarate diester as follows:

A reaction vessel is charged with 19.8 parts (0.1 mol) of (4,5-divinyl-1,3-dioxolan-2-yl)butanol, 8.6 parts (0.05 mol) of freshly distilled diethyl fumarate, 0.25 part of lead octoate and about 20 parts of toluene. The temperature of the charge is raised slowly to 175° C. while removing the toluene-ethanol mixture evolved, until a constant head temperature of about 112° C. is reached. A nitrogen purge is used to sweep out the residual toluene. The product is identified as di[(4,5-divinyl-1,3-dioxolan-2-yl)butyl]fumarate.

A coating composition of 2.5 parts of the above fumarate ester and 0.00125 part cobalt (as cobalt butyl phthalate in xylene) is prepared and coated about 1.5 mils thick on glass and Bonderited steel panels. The composition air dries in about 5 hours to a glossy, transparent, tack-free coating.

EXAMPLE 4

A reaction vessel is charged with

| | Parts |
|---|---|
| (4,5-divinyl-1,3-dioxolan-2-yl)butanol | 64 |
| Methyl methacrylate | 186 |
| Hydroquinone | 0.5 |
| Toluene | 125 |

The charge is heated to about 110° C. for five hours. The evolved methanol and toluene are removed. The pressure is reduced to about 3 mm. Hg and the residual volatiles distilled out.

The product is then diluted with 70 parts of ethyl ether, extracted several times with a 5% aqueous sodium hydroxide solution and then dried over anhydrous sodium sulfate. The ether is then evaporated with a stream of nitrogen, leaving behind a colorless liquid product which is identified as (4,5-divinyl-1,3-dioxolan-2-yl)butyl methacrylate having a boiling point of about 111° C.–112° C. at 0.7 mm. Hg.

This ester, in the presence of added peroxide or soluble cobalt, rapidly crosslinks and is suitable for use in coating or casting compositions.

In a similar manner, other alkanoic, alkenoic and aryl carboxylic acid esters are prepared by transesterification of 1,3-cyclic acetal alkanols and lower alkyl esters of the above acids, as already outlined in an early portion of this specification.

EXAMPLE 5

Di[(4,5 - divinyl - 1,3-dioxolan-2-yl)butyl]itaconate is prepared according to the process of Example 3 by replacing the diethyl fumarate with an equimolar amount of diethyl itaconate. The resulting ester, when combined with a small amount of soluble cobalt, also forms an air-drying coating composition.

EXAMPLE 6

Using the process of Example 3, di[(4,5-divinyl-1,3-dioxolan-2-yl)butyl]maleate is prepared by replacing diethyl fumarate with an equimolar amount of diethyl maleate.

EXAMPLE 7

A vessel is charged with 37.2 parts of 4,5-divinyl-1,3-dioxolan-2-yl butanal and 1 part of aluminum isopropoxide. The vessel is purged with nitrogen and the reaction allowed to proceed for about 24 hours, at or below about 35° C.

The mixture is then cooled, diluted with 70 parts of ether, extracted with dilute aqueous HCl, washed with an aqueous 5% sodium carbonate solution and dried over anhydrous sodium sulfate. The product is filtered, stripped of ether and then fractionated. The portion boiling between 147° C.–149° C. at 0.75 mm. Hg is collected. Infrared spectral and elemental analyses identify the product as (4,5-divinyl-1,3-dioxolan-2-yl)-butyl (4,5-divinyl-1,3-dioxolan-2-yl)butyrate. It boils at about 170° C. at 0.7 mm. Hg and analyzes:

Calc.: C, 67.23%; H, 8.23%. Found: C, 67.39%; H, 8.21.

Five parts of this ester are mixed with 0.0025 part of cobalt (as the butyl phthalate in xylene), coated as a 1.5 mil thick film on glass and steel panels, and allowed to air dry. At room temperature, the coatings become tack-free in about 24 hours. At 100° C. the coatings become tack-free in about 15 minutes. The coatings are clear, glossy and show excellent adhesion.

EXAMPLE 8

Using a process similar to that of Example 1, 522 parts (3 mols) of diethoxytetrahydropyran (prepared by the acid condensation of ethanol with ethoxy-3,4-dihydropyran) are reacted with 264 parts (3 mols) of monovinyl ethylene glycol. The product is fractionated, and the cut boiling between 73° C.–116° C. at 0.8 mm. Hg is collected. This cut is redistilled through a spinning band column and the cut boiling at 75° C. at 0.75 mm. Hg is collected and identified as (4-vinyl-1,3-dioxolan-2-yl) butanal by elemental analysis.

Calc.: C, 63.51%; H, 8.29%. Found: C, 62.91%; H, 8.34%.

EXAMPLE 9

A solution of 5 parts of lithium aluminum hydride in 70 parts of ether is placed in a vessel fitted with a thermometer and reflux condenser. The vessel is purged with nitrogen and 85 parts of the butanal of Example 8 are added slowly, with stirring, over a period of about 2 hours. The temperature of the mixture is kept below about 30° C. with cooling as required, and additional ether is added to maintain adequate fluidity.

After an additional hour of stirring, 40 parts of methanol are added and the mixture is dumped into cold water made slightly acid with HCl. The ether layer is separated, dried and distilled. The fraction boiling at 91° C.–92° C. at 0.7 mm. Hg is collected. Infrared spectral and elemental analyses identify the product as (4-vinyl-1,3-dioxolan-2-yl) butanol.

Calc.: C, 62.76%; H, 9.36%. Found: C, 62.89%; H, 9.43%.

EXAMPLE 10

Using the transesterification process of Example 3, 25.8 parts (0.15 mol) of (4-vinyl-1,3-dioxolan-2-yl)-butanol are reacted with 12.9 parts (0.075 mol) of diethyl maleate. After the evolved ethanol and toluene are stripped off under vacuum, a light brown viscous liquid remains. This is identified as di[(4-vinyl-1,3-dioxolan-2-yl)butyl]maleate.

Five parts of this ester, when mixed with 0.0025 part of cobalt (as cobalt butyl phthalate in xylene solution) and coated 2.2 mils thick on glass and steel panels, air dries to a colorless, glossy, tack-free film in about 4 to 6 hours. The film is tough, crack-resistant on a sharp 180° bend, and shows excellent adhesion.

EXAMPLE 11

Example 10 is repeated, replacing the diethyl maleate with an equimolar amount of diethyl itaconate. A light brown, slightly viscous liquid is obtained, which is identified as di[(4-vinyl-1,3-dioxolan-2-yl)butyl]itaconate.

EXAMPLE 12

Using the process of Example 1, 132 parts (0.83 mol) of 2,5-diethoxytetrahydrofuran, 3 parts of 85% phosphoric acid and 86 parts of divinyl ethylene glycol are reacted. The product is (4,5-divinyl-1,3-dioxolan-2-yl)-propanal, boiling at about 82° C. at 1 mm. Hg. Its elemental analysis is:

Calc.: C, 65,91%; H, 7.74%. Found: C, 64.91%; H, 7.70%.

By reducing this cyclic acetal propanal by the process of Example 2, (4,5-divinyl-1,3-dioxolan-2-yl)propanol can be prepared.

EXAMPLE 13

Example 1 is repeated, replacing the divinyl glycol by an equal molar amount of glycerol monoallyl ether. The product is identified as 4-allyloxymethyl-1,3-dioxolan-2-butanal.

The claims are:

1. A compound having the structure

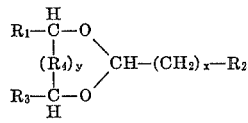

where $x$ is 2 or 3, $y$ is 0 or 1, $R_1$ and $R_3$ are hydrogen, vinyl, isopropenyl or allyloxymethyl, provided one of $R_1$ or $R_3$ is other than hydrogen, $R_2$ is

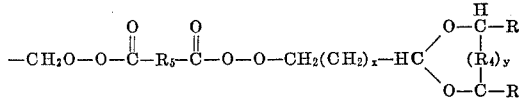

where $R_5$ is a direct carbon to carbon bond, alkylene of 1 through 10 carbon atoms or alkenylene of 2 through 14 carbon atoms,

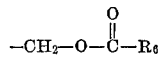

where $R_6$ is hydrogen, alkyl of 1 through 7 carbon atoms or alkenyl of 2 through 16 carbon atoms, or

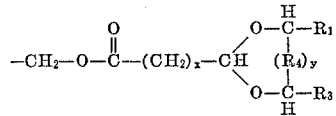

and $R_4$ is methylene, ethylene, ethylidene or isopropylidene.

2. Di[(4,5 - divinyl - 1,3 - dioxolan - 2 - yl)butyl]-fumarate.

3. Di[(4,5 - divinyl - 1,3 - dioxolan - 2 - yl)butyl]-itaconate.

4. (4,5 - divinyl - 1,3 - dioxolan - 2 - yl)butyl (4,5-divinyl-1,3-dioxolan-2-yl)butyrate.

5. Di[(4-vinyl-1,3-dioxolan-2-yl)butyl]maleate.

6. (4,5-divinyl-1,3-dioxolan-2-yl)butyl methacrylate.

References Cited

UNITED STATES PATENTS 3,225,014  12/1965  D'Alelio _____ 260—340.9 X
3,225,015  12/1965  D'Alelio _____ 260—340.9 X ALEX MAZEL, *Primary Examiner.*

JAMES H. TURNIPSEED, *Assistant Examiner.*

U.S. Cl. X.R.

106—14, 252; 260—67, 338, 340.7

UNITED STATES PATENT OFFICE
CERTIFICATE OF CORRECTION

Patent No. 3,431,280                                  March 4, 1969

Heinz F. Reinhardt

It is certified that error appears in the above identified patent and that said Letters Patent are hereby corrected as shown below:

Column 6, lines 30 to 34, the formula should appear as shown below:

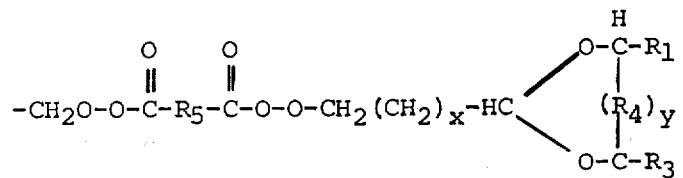

Signed and sealed this 31st day of March 1970.

(SEAL)
Attest:

Edward M. Fletcher, Jr.                          WILLIAM E. SCHUYLER, JR.
Attesting Officer                                         Commissioner of Patents